United States Patent
Hayes

(10) Patent No.: US 7,485,982 B2
(45) Date of Patent: *Feb. 3, 2009

(54) MODULAR WIRING HARNESSES

(75) Inventor: Earl J. Hayes, South Lyon, MI (US)

(73) Assignee: FCI Americas Technology, Inc., Carson City, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/705,724

(22) Filed: Feb. 13, 2007

(65) Prior Publication Data

US 2007/0152504 A1 Jul. 5, 2007

Related U.S. Application Data

(62) Division of application No. 10/394,462, filed on Mar. 21, 2003, now Pat. No. 7,199,487.

(51) Int. Cl.
B60L 1/00 (2006.01)
(52) U.S. Cl. ...................................................... 307/9.1
(58) Field of Classification Search ................... 307/9.1
See application file for complete search history.

(56) References Cited

U.S. PATENT DOCUMENTS

| 3,197,729 | A |   | 7/1965  | Sarazen ....................... 339/97   |
|-----------|---|---|---------|-----------------------------------------|
| 3,960,430 | A | * | 6/1976  | Bunnell et al. ............... 439/422  |
| 4,051,383 | A |   | 9/1977  | Dola ............................ 307/11 |
| 4,065,199 | A |   | 12/1977 | Andre et al. ................ 339/17 F  |
| 4,249,304 | A |   | 2/1981  | Weinmann et al. ............ 29/872     |
| 4,429,939 | A |   | 2/1984  | Piasecki .................... 339/97 C  |
| 4,521,969 | A | * | 6/1985  | Greenwood ................... 33/645    |
| 4,749,368 | A |   | 6/1988  | Mouissie .................... 439/421   |
| 4,824,164 | A |   | 4/1989  | Nakayama et al. .......... 296/146      |
| 4,831,278 | A |   | 5/1989  | Ueda et al. ................. 307/10.1  |
| 5,016,934 | A |   | 5/1991  | Pelz .......................... 296/214 |
| 5,195,908 | A |   | 3/1993  | Yamamoto et al. .......... 439/422      |
| 5,598,627 | A |   | 2/1997  | Saka et al. ..................... 29/861|
| 6,312,283 | B1|   | 11/2001 | Hio ........................... 439/422 |
| 6,392,148 | B1|   | 5/2002  | Ueno et al. ................ 174/72 A   |
| 6,630,625 | B1|   | 10/2003 | Akashi et al. ............. 174/72 A    |
| 6,730,622 | B2|   | 5/2004  | Curro et al. ................. 442/336  |
| 6,901,657 | B2|   | 6/2005  | Takada ........................ 29/761  |
| 2001/0023775 | A1|   | 9/2001 | Takada ..................... 174/72 A   |
| 2003/0070830 | A1|   | 4/2003 | Kondo et al. ............... 174/68.1   |

* cited by examiner

Primary Examiner—Robert L. Deberadinis
(74) Attorney, Agent, or Firm—Harrington & Smith, PC

(57) ABSTRACT

A system for making up wiring harnesses includes a base harness having a set of flexible multi-conductor cables and a set of supplementary wiring harnesses adapted to connect in a particular location of said base harness. The connection area does not have a multi-conductor replaceable connector to the base harness, so that the cost of unused connectors is not incurred. Each supplementary wiring harness connects to a reserved location. The reserved locations may be shared between mutually exclusive options.

19 Claims, 6 Drawing Sheets

MODULAR WIRING HARNESSES

CROSS REFERENCE TO RELATED APPLICATION

This is a divisional patent application of U.S. patent application Ser. No. 10/394,462 filed on Mar. 21, 2003 now U.S. Pat. No. 7,199,487.

TECHNICAL FIELD

The field of the invention is the manufacture of wiring harnesses, in particular in automotive and other motor vehicle applications.

BRIEF DESCRIPTION OF PRIOR DEVELOPMENTS

In the course of manufacturing apparatus that incorporates electrical and/or electronic functions, a recurring problem is connecting electric wires from one location to another. The most common solution in the past has been to make up a bundle of wires called a harness that can be assembled as a unit and then placed in the enclosure where it is to be used.

In the field of motor vehicle applications, a particular problem is that of cosmetic considerations. In washing machines, television sets, the customer does not see the interior. In automobiles, the customer is inside the vehicle, and is closer to any bumps in the upholstery or other noticeable effects of the wiring harness.

When the product that uses the harness has a number of options, the designers have to consider the effect of maintaining a large inventory in order to accommodate various possible combinations of options that may be ordered.

Some designers have made base harnesses that have one or more connectors to which a supplementary harness may be attached. Attaching a plug provides for flexibility, but each plug represents an additional cost, which can be recovered when the option attached to that plug is sold, but is a loss when the option is not sold.

The advent of flexible flat cables adds a further complication and has made a cost effective solution difficult to obtain.

SUMMARY OF THE INVENTION

The invention relates to a wiring harness system that employs a base harness plus a number of supplementary harnesses.

A feature of the invention is that the base harness has space reserved for a set of supplementary harnesses that are electrically and mechanically compatible.

Another feature of the invention is that the supplementary harnesses are attached by making contact to selected wires in the base harness at selected locations in a run of wire, not at dedicated connectors.

BEST MODE OF CARRYING OUT THE INVENTION

In the course of fitting wires in a confined space, such as the passenger compartment of an automobile, there is always a problem of making the required connections within the space that has been allotted by the designer. Conventionally, several wiring harnesses are used, typically each having a connector to the main harness and having a set of wires bundled together with a generally round cross section that projects away from whatever surface the harness rests against.

When options are offered by the vehicle manufacturer, it is often the case that the master harness is required to include a number of bulky connectors, in order to have provision for all possible combinations of optional accessories. Such connectors take up space and must be located somewhere they will be unobtrusive, yet within a reasonable range for running the wires to the location of the accessories that are being wired. In addition to problems of cost for connectors that are not used, there is the problem that unused connectors and wires add to the weight of the vehicle.

Figure 1:
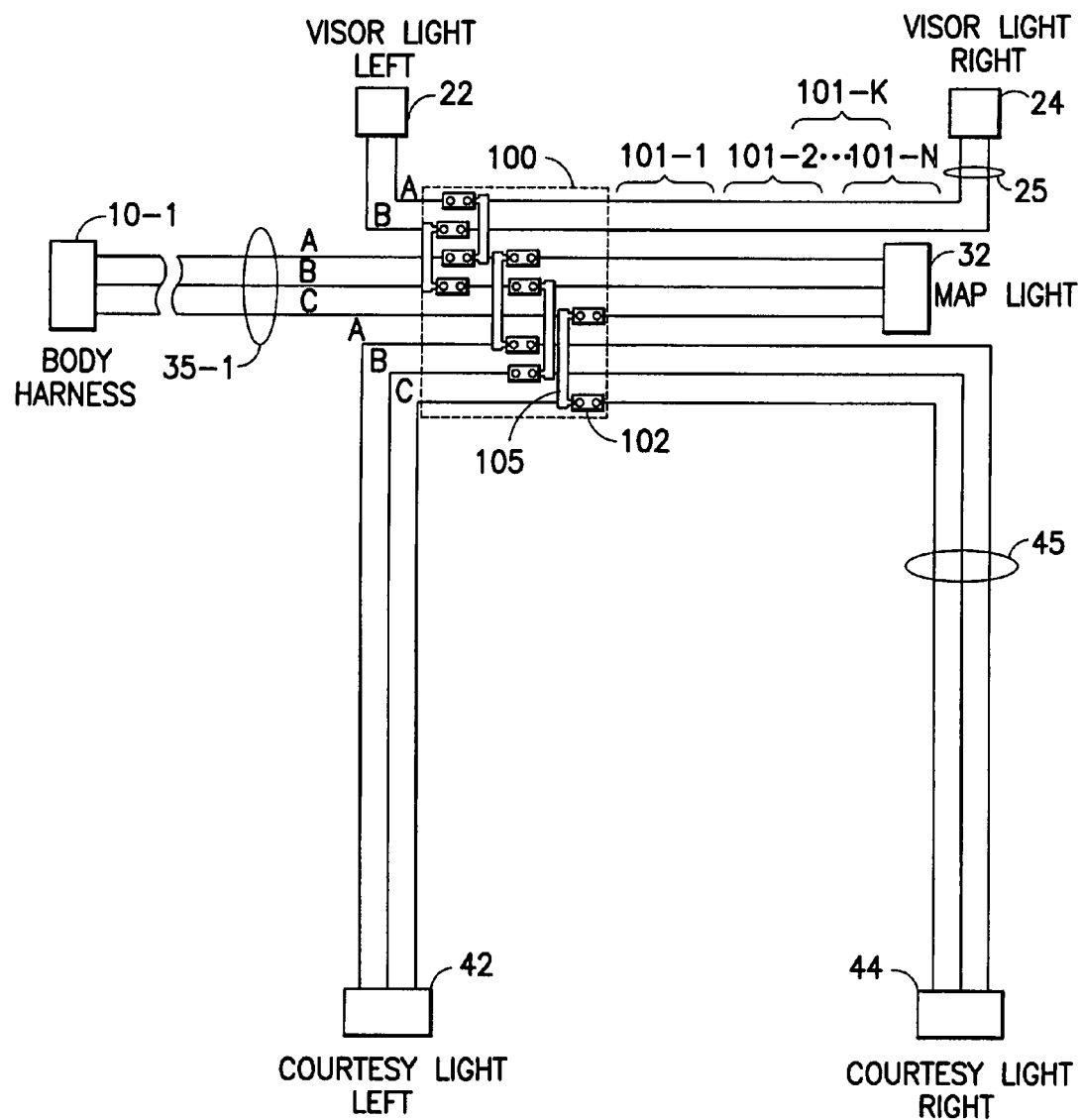
FIG. 1 illustrates in partially schematic, partially pictorial form, a base harness for use with the invention.

FIG. 1 illustrates an example of a wiring harness for a headliner (the area of the ceiling of the passenger compartment above the windshield) according to the invention. On the left of the Figure, connector 10 is the only connector between this area of the interior and the master harness (referred to as the body harness). Other harnesses that may be required will be, according to the invention, connected to selected areas of the headliner harness and not through additional connectors to the body harness. Connector 10-1 is modular—i.e. it is designed with a base connector unit and additional connector modules, shown as 10-2 in FIG. 2 and 10-3 in FIG. 3, may be attached to it. In practice, there will be a single connector block and a number of flexible flat cables will be inserted in it from the body side and from the headliner side. This approach has the virtue of saving space, since room is not taken up by unused connectors, saving the weight of unused connectors and permitting flexibility in designing compatible modules that "piggyback" on a connector by attaching to a wire coming out of the connector, rather than putting an extra contact in the connector that may or may not be used.

In this example, connector 10-1 is connected to a three-wire flexible flat cable 35-1, referred to as the base harness, extending left to right in the Figure, ending at map light 32. At the top of the Fig., a two-wire flexible flat cable 25 connects the left and right visor lights 22 and 24. Flexible flat cable 25 is connected to flexible flat cable 35-1 through modular connection 100, comprising a set of substantially flat shunts 105, illustratively NetFlex shunts made by FCI, USA of Etters, Pa. As an example, two short metal strips 102 containing prongs, are attached to the lowest wire in cable 45 and to the lowest wire in cable 35-1. The metal strips are connected to the cables by penetration and crimping the prongs, as described with respect to FIG. 6 below. To make the connection, a flat metal strip 105 connects the two pieces 102.

Preferably, a conductor or signal passes through connector 10-1 in only one location. For example, in FIG. 1, a possible allocation of functions to wires is that flat flexible cable 35-1 has DC power on line A, ground on line B and switched power (from switches in the car doors) on line C. Corresponding lines A and B in flat flexible cables 25 and 45 are connected through module 100. Thus, the map light and the courtesy light (but not the visor lights) turn on when the car doors are opened. This arrangement permits the minimum number of connections from the body harness to the headliner.

Conductors in a flat flexible cable, which have the form of flat metal strips, will be referred to interchangeably as conductors or wires. Conductors, such as conductor A in flat flexible cables 35, 25 and 45, will be said to have duplicate functions (power, ground, switched power), etc.

Figure 6A:
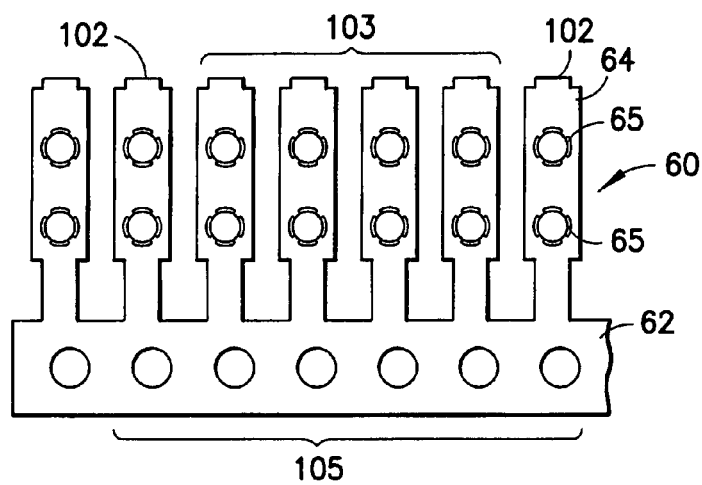
FIGS. 6A-6B illustrate a connector for use with the harnesses of the preceding figures.
Figure 6B:
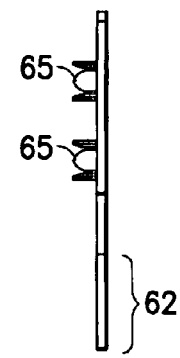

FIGS. 6A and 6B show a portion 60 of the components that form a shunt that attaches to a flexible flat cable. Metal base strip 62 supports a set of two-prong crimping members 64 that project at regular intervals to make contact to flexible flat cables. Bracket 105 indicates the extent of a sample shunt, e.g. the shunts in FIG. 1. Bracket 103 indicates strips that will be removed, leaving the two strips denoted by numeral 102 as the ones to make contact. In operation, the prongs of one strip, 64, remaining after the strips marked by bracket 103 have been removed, punch through a foil (e.g. 45 in FIG. 1) and are crimped to make electrical contact. The other strip 64 does the same with the other flexible flat cable 35-1. A side view of a strip 64 is shown in FIG. 6B, showing the attachment to strip 62 and the prongs 65, illustratively a set of four prongs that penetrate the foil of a cable being attached and are crimped to provide a secure mechanical connection.

Other members of the connector family have fittings that are inserted into a connector block so that the cable can be removed and replaced (connectors that can be repeatedly removed and inserted being referred to as "replaceable connectors"). Further, other members of the connector family are adapted to connect from flexible flat cables to wires, to have solder connections, etc. U.S. Pat. No. 4,749,368, incorporated by reference, gives further information on these connectors.

This feature of the invention permits a compact connection that takes up little projecting space perpendicular to the plane of the paper and distributes power and/or signals to end points of the harness (in this case the lamps 22 and 24).

At the bottom of FIG. 1, a three-wire flexible flat cable 45 connects the left and right courtesy lights 42 and 44. The three wires in flexible flat cable 45 are also connected to flexible flat cable 35-1 by shunts 105.

Along the length of flexible flat cable 25, a set of brackets 101-1, 101-2, - - - 101-N denote locations to which additional harnesses may be connected. Bracket 101-K indicates that the spaces may overlap.

Figure 2:
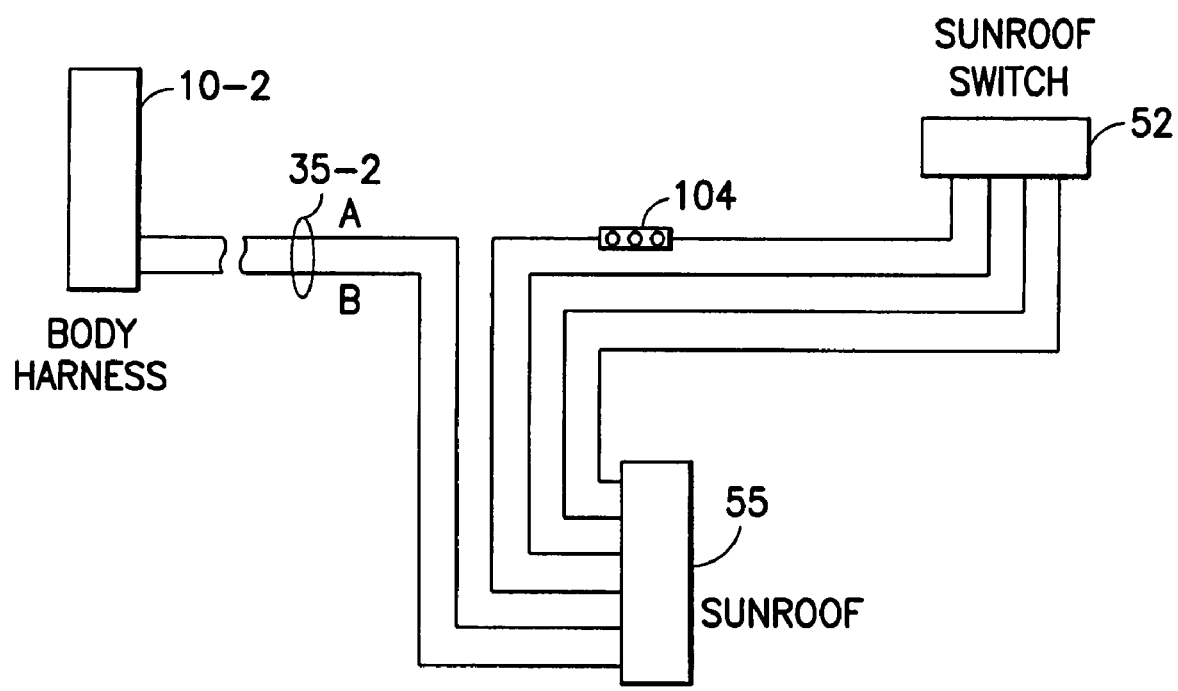
FIG. 2 illustrates a first supplementary harness.

FIG. 2 illustrates an example of a supplementary harness for an option—in this case a sunroof. On the left, connector 10-2 fits together with connector 10-1 from FIG. 1 in a composite connector to attach to the body harness. A flexible flat cable 35-2 will extend parallel to its counterpart 35-1, terminating in a sunroof switch 52 and the connector to the sunroof mechanism 55. A jumper terminal 104 is provided to connect to one of the wires in flexible flat cable 35-1. Some portions of flexible flat cable 35-2 will overlay a portion of flexible flat cable 35-1 to make the connection, providing an additional advantage of minimizing the width of the set of flexible flat cables.

Figure 3A:
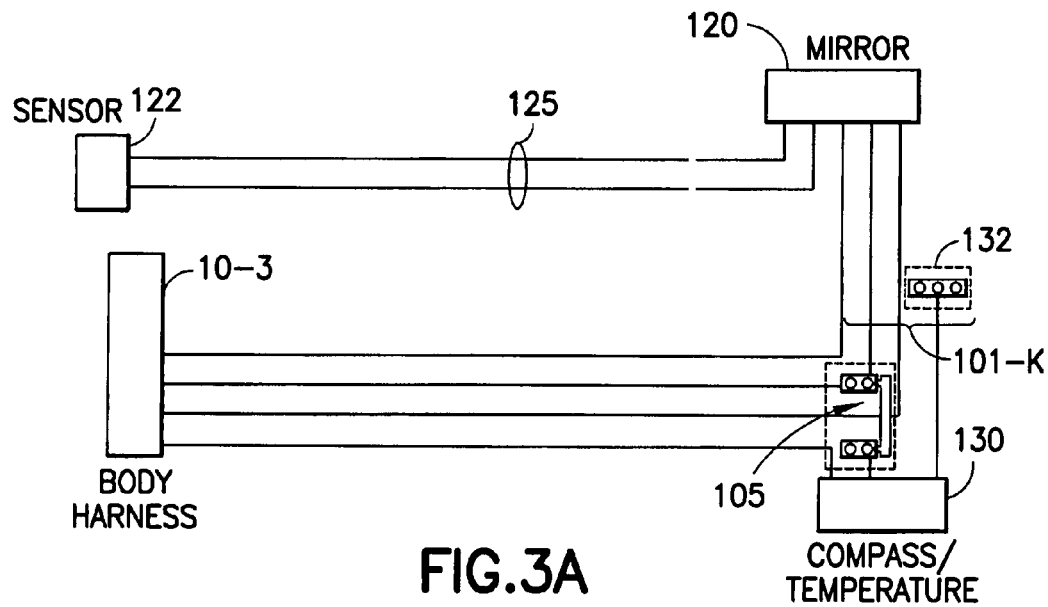
FIGS. 3A and 3B illustrate alternative versions of a third harness.
Figure 3B:
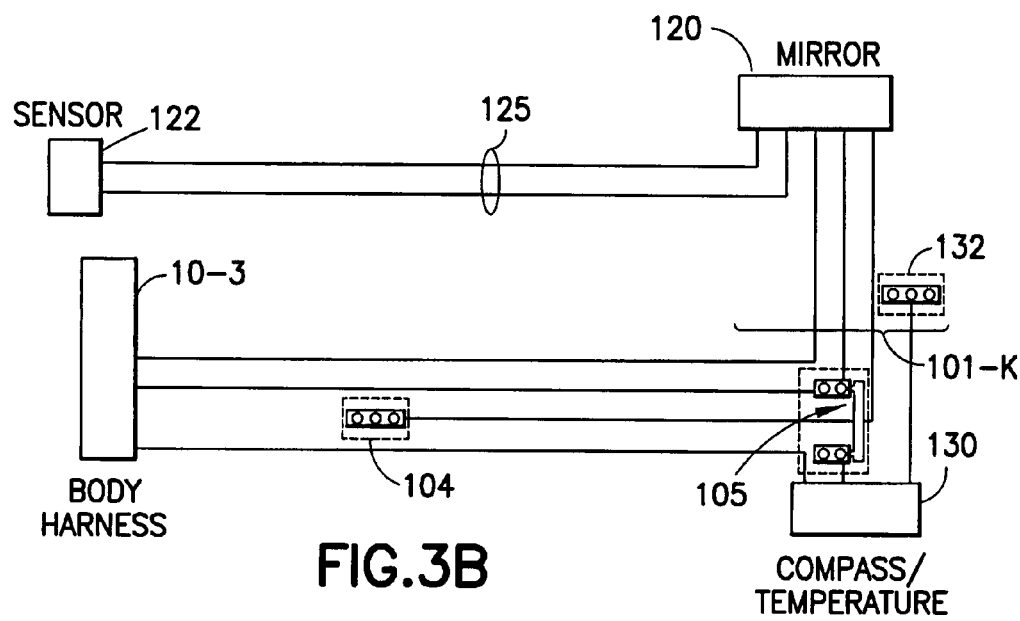

FIGS. 3A and 3B show subsets of supplementary wiring harnesses. FIG. 3B shows a member of the subset adapted to accommodate or have provision for attachment of a sunroof, with jumper 104. FIG. 3A shows a member not adapted for the attachment of a sunroof.

FIGS. 3*a* and 3B illustrate an advantageous feature of the invention—that the supplementary harnesses are preferably integrated, so that two versions of this ?mini-console harness are provided for vehicles with and without a sunroof. In each case, connector 10-3 fits with connector 10-1, as does connector 10-2, to form a composite connector. In each case also, the harness accommodates a light sensor 122 for the rear view mirror 120 and a compass/temperature module 130. A jumper 132 connects to a wire in the harness of FIG. 1 that runs vertically in the figure, illustrating the flexibility of the connectors, which can make contact between parallel and perpendicular foil strips with the same connector. A jumper 104 in the sunroof harness of FIG. 3B does not have a counterpart in FIG. 3A.

Figure 4:
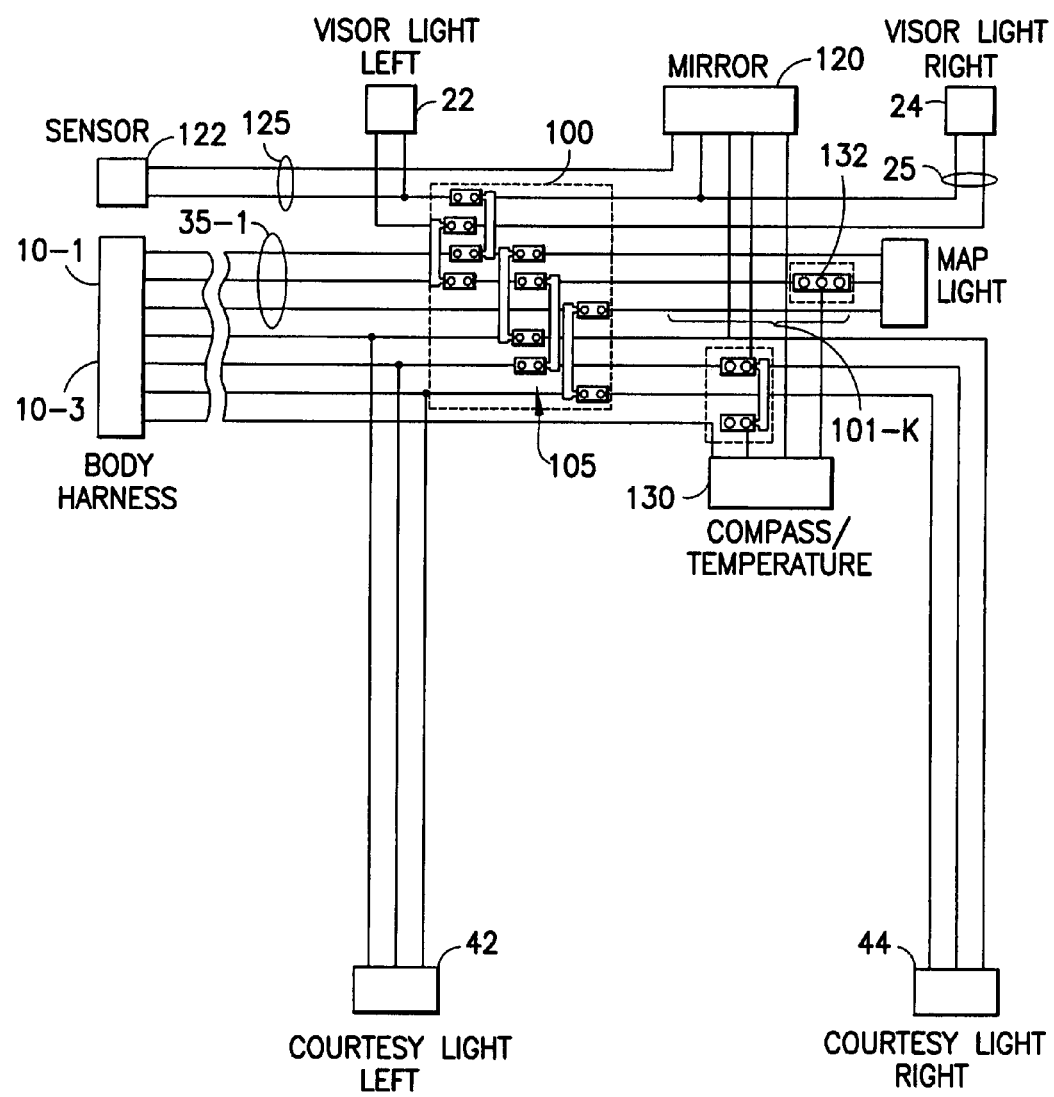
FIGS. 4 and 5 illustrate an overall view of a harness with different options.

Referring now to FIG. 4, there is shown the combination of the headliner harness of FIG. 1 with the mini-console of FIG. 3A in a non-sunroof vehicle.

Bracket 101-K, at the right side of the figure, indicates the area where the harness of FIG. 3*a* fits together with the headliner harness. The connection of jumper 132 with the center line of flexible flat cable 35-1 demonstrates the compact layout permitted by the present invention.

Figure 5:
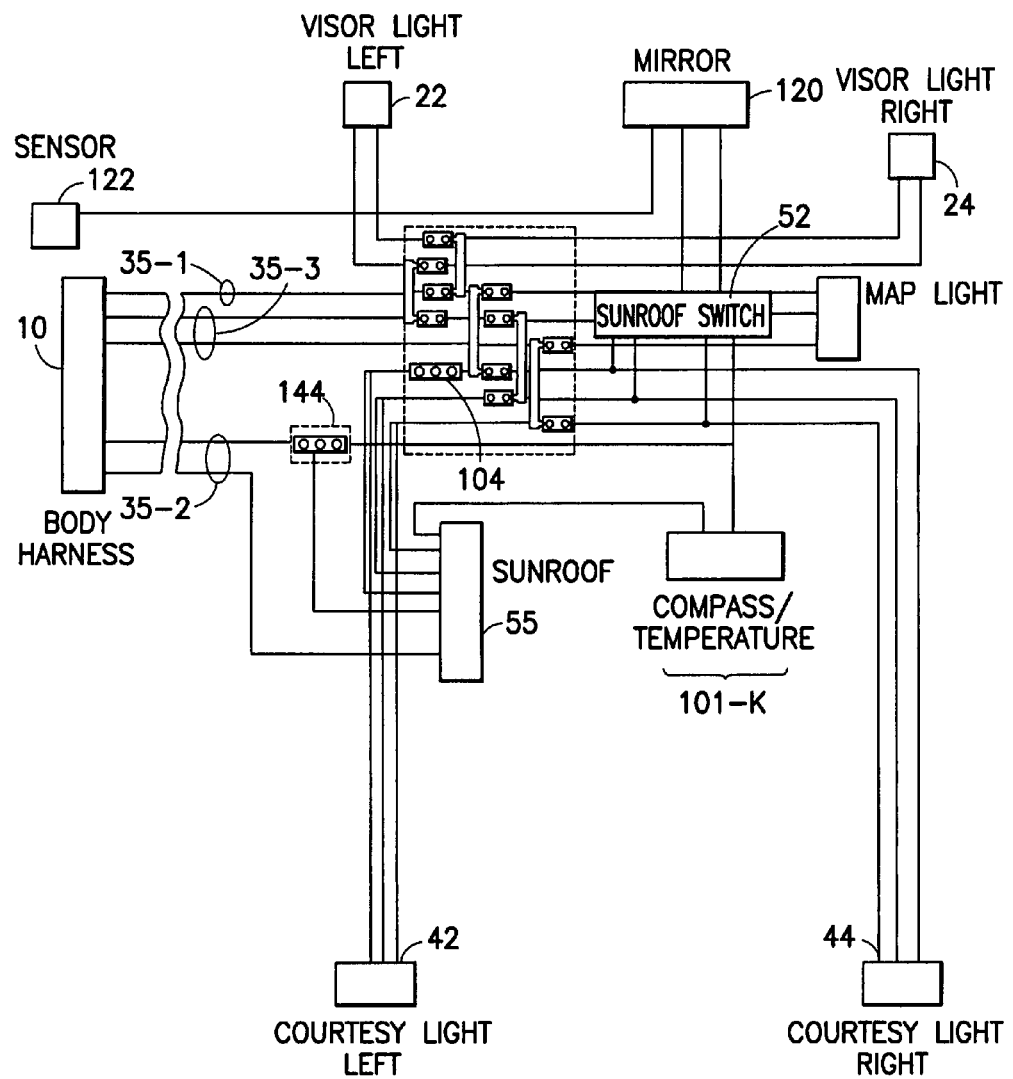

Referring now to FIG. 5, there is shown the combination of the headliner harness, the mini-console and the sunroof. Bracket 101-*k* shows the area where the mini console attaches to the headliner harness. It is evident that the sunroof harness connection overlaps the mini console connection, with the sunroof switch being at the same left-right position as the compass/temperature unit and jumper 104 of the sunroof being to the left of some of the shunts 105 in area 100. Jumper 104, shown in FIG. 2, and jumper 104, shown in FIG. 3B, are the same jumper 104 in FIG. 5. An additional jumper 144 connects line A of 35-2 of FIG. 2 to one of the lines to the Mini-Console.

Those skilled in the art will appreciate that harnesses constructed according to the invention may have more than one layer of wiring at the same location of the surface that supports the harness; i.e. that the lines in the figure that overlap may represent two or more flexible flat cables that are superimposed.

Another advantageous feature of the invention is that the jumpers and shunts are attached by machine, resulting in lower cost and greater reliability than a connection made by hand.

What is claimed is:

1. A motor vehicle electrical wiring assembly comprising:
    a master harness comprising a first flat flexible cable comprising a plurality of first flat metal conductors;
    at least one supplementary harness comprising a second flat flexible cable, wherein the second flat flexible cable comprises a plurality of second flat metal conductors; and
    at least one crimp connector comprising at least three crimping member sections connected by a flat base strip section, wherein the crimping member sections each comprise a flat strip with at least one group of prongs, wherein the at least one crimp connector is adapted to permit the connection of the at least one supplementary harness to the master harness, wherein the group of prongs of a first one of the at least three crimping member sections are adapted to pierce through one of the plurality of first flat metal conductors of the master harness, wherein the group of prongs of a second one of the at least three crimping member sections are adapted to pierce through one of the plurality of second flat metal conductors of the supplementary harness, and wherein a third one of the at least three crimping member sections is adapted to be selectably removed from the flat base strip section.

2. The motor vehicle electrical wiring assembly of claim 1 wherein the master harness comprises a single connector.

3. The motor vehicle electrical wiring assembly of claim 2 wherein the first flat flexible cable extends from the single connector.

4. The motor vehicle electrical wiring assembly of claim 3 wherein the first flat flexible cable is configured to end at a first electrical accessory.

5. The motor vehicle electrical wiring assembly of claim 4 wherein a first one of the at least one supplementary harness is configured to be electrically connected to the master harness at a first one of a plurality of locations between the single connector and the first electrical accessory.

6. The motor vehicle electrical wiring assembly of claim 5 wherein a second one of the at least one supplementary harness is configured to be electrically connected to the master harness at a second one of the plurality of locations between the single connector and the first electrical accessory.

7. The motor vehicle electrical wiring assembly of claim 6 wherein the first one of the plurality of locations between the single connector and the first electrical accessory overlaps with the second one of the plurality of locations between the single connector and the first electrical accessory.

8. The motor vehicle electrical wiring assembly of claim 1 wherein the crimping member sections project at intervals corresponding to a least one of the plurality of first flat metal conductors.

9. The motor vehicle electrical wiring assembly of claim 1 wherein the second flat flexible cable is configured to extend from an optional electrical accessory.

10. The motor vehicle electrical wiring assembly of claim 1 wherein at least one of the plurality of first flat metal conductors has duplicate functions.

11. The motor vehicle electrical wiring assembly of claim 1 wherein at least one of the plurality of second flat metal conductors has duplicate functions.

12. A crimp connector comprising:
a base strip; and
a plurality of selectably removable flat flexible cable (FFC) crimping members extending from the base strip, wherein a first one of the plurality of selectably removable FFC crimping members is adapted to connect to a first conductor, wherein a second one of the plurality of selectably removable FFC crimping members is adapted to connect to a second conductor, and wherein one or more other ones of the plurality of selectably removable FFC crimping members is adapted to be selectably removed from the base strip from a location between the first and the second FFC crimping members to thereby form the crimp connector having the first and the second FFC crimping members connected to each other by the base strip with a gap therebetween, wherein the gap is formed by the removed one or more other ones of the selectively removable FFC crimping members.

13. The crimp connector of claim 12 wherein the first conductor is a first flat metal conductor.

14. The crimp connector of claim 12 wherein each of the selectably removable FFC crimping members is a two prong FFC crimping member.

15. The crimp connector of claim 12 wherein the first one of the plurality of selectably removable FFC crimping members is adapted to pierce through the first conductor.

16. The crimp connector of claim 12 wherein the second one of the plurality of selectably removable FFC crimping members is adapted to pierce through the second conductor.

17. The crimp connector of claim 12 wherein the plurality of selectably removable FFC crimping members are configured to project at intervals corresponding to a plurality of flat metal conductors.

18. A method of manufacturing a crimp connector, the method comprising:
providing a base strip and a plurality of integrally formed selectably removable flat flexible cable (FFC) crimping members, wherein the plurality of selectably removable FFC crimping members extend from the base strip; and
selectably removing at least one of the selectably removable FFC crimping members from the base strip to form a crimp connector comprised of at least two FFC crimping members.

19. A method of attaching a crimp connector to a harness, the method comprising:
manufacturing a crimp connector as in claim 18;
aligning a first one of a plurality of selectably removable FFC crimping members to a first conductor;
piercing the first one of the selectably removable FFC crimping members through the first conductor to make electrical contact;
aligning a second one of a plurality of selectably removable FFC crimping members to a second conductor;
piercing the second one of the selectably removable FFC crimping members through the second conductor to make electrical contact; and
removing a third one of the selectably removable FFC crimping members from the base strip where electrical contact is not desired.

* * * * *